Patented Aug. 29, 1950

2,520,882

UNITED STATES PATENT OFFICE 2,520,882

PROCESS FOR THE MANUFACTURE OF FOLIC ACID

Paul Karrer, Zurich, Switzerland, assignor to Hoffmann-La Roche Inc., Nutley, N. J., a corporation of New Jersey No Drawing. Application January 15, 1949, Serial No. 71,215. In Switzerland March 1, 1948

3 Claims. (Cl. 260—251.5)

The present invention relates to the manufacture of folic acid.

It has been found, according to the present invention, that folic acid is formed by reacting, in solution, 2,4,5-triamino-6-hydroxy-pyrimidine, glycero-aldehyde-ditoluene-sulfonic acid ester, having the following structure:

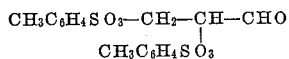

(Karrer, Helv. Chim. Acta., 31, 784–786 (1948)); para-amino-benzoyl-1(+)-glutamic acid and an iodide, for instance, potassium iodide, with one another. No folic acid is formed in the absence of the iodide.

The reaction products obtained in accordance with the present process contain 6 to 10% of folic acid.

Example 0.8 part by weight of 2,4,5-triamino-6-hydroxy-pyrimidine, 2.0 parts by weight of ditoluene-sulfonic acid ester of the glycero-aldehyde, 1.4 parts by weight of para-amino-benzoyl-1(+)-glutamic acid and 40 parts by weight of sodium-acetate are dissolved, under hydrogen atmosphere, in a mixture of 250 parts by volume of water and 750 parts by volume of methanol. A solution of 2.5 parts by weight of potassium iodide is added, in one portion, at 0-5° C. to the clear solution. The solution is left to stand at 0-5° C. for 55 hours, whereupon it is filtered off from a small portion of a red precipitate and evaporated in vacuo at 30° C. The residue is extracted with cold acetone and thereupon dissolved in as little water as possible. Upon addition of hydrochloric acid until a pH of 3.5 is reached, a precipitate of about 0.5 part by weight is formed which has a folic acid content of 6 to 10%.

Further purification can be carried out by known methods.

I claim:

1. Process for the manufacture of folic acid comprising reacting together, in solution, 2,4,5-triamino-6-hydroxy-pyrimidine, glycero-aldehyde-ditoluene-sulfonic acid ester, para-amino-benzoyl-1(+)-glutamic acid and potassium iodide.

2. The process according to claim 2, in which the reaction is carried out at a temperature of about 0-5° C.

3. Process for the manufacture of folic acid comprising reacting together, in solution, 2,4,5-triamino-6-hydroxy-pyrimidine, glycero-aldehyde-ditoluene-sulfonic acid ester, para-amino-benzoyl-1(+)-glutamic acid and an iodide.

PAUL KARRER.

No references cited.

Certificate of Correction

August 29, 1950

Patent No. 2,520,882

PAUL KARRER

It is hereby certified that error appears in the printed specification of the above numbered patent requiring correction as follows:

Column 2, line 19, for the claim reference numeral "2" read *1*;

and that the said Letters Patent should be read as corrected above, so that the same may conform to the record of the case in the Patent Office.

Signed and sealed this 14th day of November, A. D. 1950.

[SEAL]

THOMAS F. MURPHY,
*Assistant Commissioner of Patents.*